United States Patent
Eade (10) Patent No.: US 7,693,482 B2
(45) Date of Patent: Apr. 6, 2010

(54) MOBILE POSITIONING

(75) Inventor: Philip Geoffrey Eade, New Malden (GB)

(73) Assignee: Nokia Corporation, Espoo (FI)

( * ) Notice: Subject to any disclaimer, the term of this patent is extended or adjusted under 35 U.S.C. 154(b) by 1615 days.

(21) Appl. No.: 10/794,519

(22) Filed: Mar. 5, 2004

(65) Prior Publication Data

US 2004/0192199 A1    Sep. 30, 2004

(30) Foreign Application Priority Data

Mar. 27, 2003 (GB) ................................. 0307030.7

(51) Int. Cl.
*H04B 7/185* (2006.01)
*H04W 24/00* (2009.01)
(52) U.S. Cl. .................... 455/12.1; 455/427; 455/456.1
(58) Field of Classification Search ...................... 455/7, 455/11.1, 12.1, 17, 422, 440, 456.1, 427, 455/556.1, 557, 344
See application file for complete search history.

(56) References Cited

U.S. PATENT DOCUMENTS

| | | | | |
|---|---|---|---|---|
| 4,164,648 A * | 8/1979 | Chu | ............................. | 377/20 |
| 5,270,666 A * | 12/1993 | Rapeli et al. | ................. | 329/341 |
| 5,361,407 A * | 11/1994 | Sawada et al. | ............... | 455/209 |
| 5,535,432 A * | 7/1996 | Dent | ............................ | 455/77 |
| 5,739,786 A | 4/1998 | Greenspan et al. | ........ | 342/357.1 |
| 6,028,887 A * | 2/2000 | Harrison et al. | ............. | 375/147 |
| 6,041,222 A * | 3/2000 | Horton et al. | ................ | 455/255 |
| 6,067,503 A | 5/2000 | Yakos | ......................... | 701/213 |
| 6,133,871 A * | 10/2000 | Krasner | .................. | 342/357.06 |
| 6,243,587 B1 * | 6/2001 | Dent et al. | ................ | 455/456.2 |
| 2002/0172267 A1 * | 11/2002 | Abraham et al. | ............ | 375/150 |
| 2003/0045259 A1 * | 3/2003 | Kimata | ......................... | 455/260 |
| 2003/0107442 A1 * | 6/2003 | Staszewski | .................. | 331/1 A |
| 2003/0176204 A1 | 9/2003 | Abraham | .................. | 455/556.1 |
| 2004/0130484 A1 | 7/2004 | Krasner | .................. | 342/357.02 |

FOREIGN PATENT DOCUMENTS

| | | |
|---|---|---|
| EP | 1 092 987 A2 | 4/2001 |
| JP | 11174170 | 7/1999 |
| WO | WO-01/86316 A2 | 11/2001 |
| WO | WO-03/038464 A2 | 5/2003 |
| WO | WO-2004/055543 | 7/2004 |

\* cited by examiner

*Primary Examiner*—Quochien B Vuong
(74) *Attorney, Agent, or Firm*—Harrington & Smith (57) ABSTRACT

A dual mode device (110) comprising a communications block (120) and a satellite positioning block (130), each comprising respective Base Band (BB) blocks (123, 132) and crystals or frequency sources (122, 1312). The communications crystal (122) provides a cellular clock signal (FS1) to the satellite positioning block (130), which monitors the difference in the frequencies the crystals produce (FS1, FS2), using Vernier interpolation to gain a resolution greater than one clock cycle. The positioning crystal (1312) is used independent of the cellular crystal to demodulate satellite signals. The positioning BB (132) tracks the demodulated satellite signals compensating any errors caused by the positioning crystal signals (FS2) to the demodulation, using the information resulting from the monitoring. The communications crystal is capable to network based calibration and the positioning BB can compensate for the fluctuation thus caused in the cellular clock signal (FS1).

17 Claims, 5 Drawing Sheets

MOBILE POSITIONING

PRIORITY STATEMENT

This application claims priority to UK Patent Application Number 0307030.7, filed on Mar. 27, 2003.

FIELD OF THE INVENTION

This invention relates to mobile positioning. The invention relates particularly, but not exclusively, to increasing the reliability and capability of satellite based mobile positioning with the assistance of a radio telecommunications network.

BACKGROUND OF THE INVENTION

Satellite positioning such as the Global Positioning System (GPS) is based on providing a receiver with frequent radio sequences containing Code Division Multiple Access (CDMA) coded data by decoding which the receiver can determine very accurately the radio propagation delay relative to the satellite. With the signals of at least four different satellites, a GPS receiver can determine its position.

When switched on, a GPS receiver will first search for satellites in a so-called acquisition process. In successful acquisition a GPS receiver determines very accurately the frequencies of say, four satellites relative to its own GPS local oscillator or clock and decodes their signals. After the acquisition, the receiver must be able to track the satellites. This involves continually receiving signals from the satellites. Of course, the frequencies on which the satellite signals are received depend on the mutual motion of the satellites and the GPS receiver and hence the GPS receiver needs to compensate for the change to maintain the tracking.

GPS satellites orbit around the globe at some 20 000 km height and hence their radio signals cover a significant surface. Inversely, the power of these signals is very small when received by a GPS receiver at a sea level, particularly compared to the power of the signals that can be received from mobile communication networks, for example. Further, the weaker the GPS signals are, the more difficult it is to find their frequency.

Different crystals are typically used as clocks in GPS receivers. Crystals have a favourable balance of accuracy and price for this use. However, the frequency provided by a crystal depends on its temperature. Even worse, the temperature dependence may not be linear, but may follow a curve that has greatly variable positive, negative and again positive gradients on increasing temperature within the range of −20 to +60 degrees Celsius. At certain temperatures the gradient is negligible and hence some high precision devices contain an oven regulated to keep a constant temperature above the ambient temperature to avoid temperature change originated clock drifting. It is also known to use complex expensive temperature compensated crystals (TCXO) or even more complex Temperature Compensated Voltage Controlled Oscillators (TCVCXO) where the frequency of the clock can be further regulated to remain sufficiently constant. The more advanced these clocks are in technology, however, the more expensive and complex they are. It would be beneficial to use a non-compensated plain crystal as a clock.

Common to the different types of crystals used as GPS receiver clocks, they all have a far lower frequency than that on which the GPS signals are received. A frequency multiplication is thus needed typically by means of a phase locked loop (PLL) and Voltage Controlled Oscillator (VCO). Typically, the GPS receiver clock frequency is 10 to 30 MHz, and conversely a multiplier of roughly 50 to 160 is needed to produce a signal close to the GPS radio frequency that can be used in demodulating the GPS signals. In principle, the accuracy of the demodulation signal should have the same relative accuracy as the GPS receiver clock has, regardless of the frequency of the GPS receiver clock. If the GPS receiver clock is accurate to 1 Part Per Million (ppm) or $\frac{1}{10}$ ppm, then respectively the demodulation signal should be accurate to 1 or $\frac{1}{10}$ ppm, respectively. In comparison, the clocks used in GPS satellites are very accurate. They use atomic clock references and should have stabilities better than 0.01 ppb (that is 0.00001 ppm).

U.S. Pat. No. 5,841,396 discloses a combined mobile telephone and GPS receiver, wherein a clock of the mobile telephone is used to produce a relatively accurate GPS demodulation signal. The clock of the mobile telephone is also synchronised with a high-precision clock of a base station by using the radio signals received from the base station, based on the fact that the base station couples the frequency of its radio transmission to its high-precision clock that typically has stability in the magnitude of ±0.05 ppm. The mobile telephone frequency stability is generally standardised as better than ±0.5 ppm.

SUMMARY OF THE INVENTION

According to a first aspect of the invention there is provided a mobile communication and positioning device comprising:
a first frequency source capable of producing a temperature compensated first frequency signal;
a second frequency source capable of producing a second frequency signal having a frequency independent of the first frequency source;
a satellite positioning demodulator capable of demodulating radio signals of a satellite transmission based on the second frequency signal;
a detector for detecting, with a resolution higher than one clock cycle of the second frequency signal, changes in the frequency difference between the first frequency signal and the second frequency signal by using interpolation; and
a decoder for decoding the demodulated satellite radio signals configured to take into account the changes in the frequency difference to compensate for errors of the demodulation caused by frequency drifts in the second frequency signal.

Advantageously, producing a second frequency signal independent of the first frequency signal and the detector being used to compensate for errors caused by the second frequency signals by using interpolation allows more reliable and sensitive decoding than that disclosed in U.S. Pat. No. 5,841,396. The inventor realised that when the demodulation signals are locked to the frequency of base station signals as in U.S. Pat. No. 5,841,396, they can only be determined to an accuracy of approximately ±0.5 ppm. When a weak GPS signal is being acquired or tracked a GPS engine may require stability in the order of ±0.01 ppm or better. Further, a simple and inexpensive non-temperature compensated crystal may be used as the second frequency source. The second frequency signal will then freely drift so that the demodulation of satellite signals will correspondingly fluctuate, but this fluctuation can be accurately corrected by the decoder. The interpolation enables the difference between the first and second signals to be detected by a resolution finer than a single period of either of the first and second signals that are being compared. This is particularly useful as typically the first and second frequency signals have significantly lower frequencies than the satellite signals and hence mere comparison of the first and second signals with a single clock cycle resolution would result in substantial errors at the demodulator. Hence, the comparison with a single second frequency signal clock cycle, for example, on 10 MHz frequency may cause an error of numerous Hz on a 1575 MHz frequency.

The inventor further realised that the arrangement of U.S. Pat. No. 5,841,396 is prone to errors in GPS reliability if the first frequency signal is updated at a relatively low rate such as 0.5 to 1 Hz. In this case, the second frequency signal may drift between two subsequent updates, particularly when in the temperature range where any of the first or second frequency sources is substantially dependent on temperature shocks. The inventor found that any drifting occurring in the first frequency signal would also flow into the second frequency signal.

The inventor also realised that it may be advantageous for the second frequency source to be of a temperature non-compensated type unlike the first frequency source so that temperature shocks would cause a difference in the operation of the two frequency sources and allow more reliable determination of the effects of such shocks as the two frequency sources would not both change their operation in a same way. Alternatively, both the first and second frequency sources may be of the same type but have a different frequency response to a temperature shock.

The first frequency signal may be adapted for use in mobile communication. The mobile communication device may further comprise a mobile communication modulator capable of modulating information signals for radio transmission to a terrestrial base station based on the first frequency signal. Hence, the first frequency signal may also facilitate in controlling radio transmission frequencies.

The detector may be configured to apply the Vernier method for interpolating the frequency difference. Averaging of consecutive interpolation results may be used to further improve the accuracy of the determination of the changes in frequencies between the first and second frequency signal.

The interpolation further improves the satellite reception through enhancing the resolution of a less accurate and/or stable second frequency source by using the relatively stable frequency source used for cellular communications with its inherently slower temperature compensated crystal used as a frequency source.

The detector may have been configured to detect only the changes in the frequency difference between the first and second frequency signals or the absolute relationship between these frequencies. Alternatively, the detector may have been configured to detect both the absolute relationship and the changes in the frequency difference.

The detection of the changes in the frequency difference may suffice to maintain satellite tracking after the decoder has successfully decoded satellite signals.

The first frequency source may have been configured to repeatedly calibrate itself to provide a substantially stable first frequency signal using a frequency source of the base transceiver station. The detector may be configured to determine changes in the first frequency signal that have been caused by controlling the first frequency source based on the frequency source of the base station. The determined changes in the first frequency signal due to the frequency control may be subsequently compensated in order to stabilise the decoding, for example by stabilising the frequency difference used to compensate for errors of the demodulation caused by the changes in the second frequency signal.

The calibration of the first frequency source using the base station may provide temperature compensation for the first frequency source. Further, the first frequency source may be of a temperature compensated type such that it attempts to compensate for temperature changes independent of any base station controlled calibration.

By letting the second frequency signal drift without attempting to adjust it with the first frequency signal and detecting the difference it is possible to determine the base station control caused changes in the first frequency signal without a need to provide a very fast interface between the decoder and the circuitry responsible for the first frequency signal calibration.

Surprisingly, by using a second frequency source, it is possible to determine sudden changes in the first frequency signal even if the second frequency source were much less stable than the first frequency source, because normal temperature shock based drifts are relatively slow to change compared to the changes that control steps such as Automatic Frequency Control (AFC) steps, for example, may cause in the first frequency signal. Hence, it is possible to provide an extent of smoothness to the operation of the positioning radio circuitry as the fluctuation in the first frequency signal can be compensated. For example, it is possible to reliably track the satellite signals even if the updates of the first frequency signal were relatively far from each other with intervals such as 0.5 to 1 or 2 seconds.

Further advantageous to the invention, an ordinary and reasonably inexpensive crystal based clock can be used for the demodulation instead of a frequency synthesiser controlled by the first frequency signal. Further, it is possible to use satellite positioning whilst the mobile communications circuitry performs limited operations, for example when in a passive or sleep mode wherein it receives base station signals at a degraded frequency accuracy of say ±0.75 ppm.

The mobile communication device may comprise a receiver for receiving satellite control and communication signals from the base station for network assisted satellite positioning.

According to a second aspect of the invention there is provided a method of operating a mobile communication and positioning device comprising:

producing a temperature compensated first frequency signal;

producing a second frequency signal having a frequency independent of the first frequency source;

demodulating radio signals of a satellite transmission based on the second frequency signal;

detecting, with a resolution higher than one clock cycle of the second frequency signal, changes in the frequency difference between the first frequency signal and the second frequency signal by using interpolation; and decoding the demodulated satellite radio signals taking into account the changes in the frequency difference to compensate for errors of the demodulation caused by frequency drifts in the second frequency signal.

According to a third aspect of the invention there is provided a computer program product for controlling a mobile communication and positioning device that comprises a first frequency source capable of producing a temperature compensated first frequency signal; a second frequency source capable of producing a second frequency signal having a frequency independent of the first frequency source; and a satellite positioning demodulator capable of demodulating radio signals of a satellite transmission based on the second frequency signal; the computer program product comprising:

computer executable program code for causing the mobile communication device to detect, with a resolution higher than one clock cycle of the second frequency signal, changes in the frequency difference between the first frequency signal and the second frequency signal by using interpolation; and computer executable program code for causing the mobile communication device to decode the demodulated satellite radio signals configured to take into account the changes in the frequency difference to compensate for errors of the demodulation caused by frequency drifts in the second frequency signal.

The mobile communication device may contain means for receiving the computer program product on request of a user. The means for receiving the computer program may comprise means for receiving the computer program product at least partially from a radio transmission.

The mobile communication device may comprise a central processing unit for causing the mobile communication device to perform both the detecting and to take into account the changes in the frequency difference on decoding satellite signals. Alternatively, the mobile communication device may comprise a distributed processor than comprises two or more processor.

The mobile communication device may contain a memory for storing the computer program product.

The computer program product may be stored on a memory media such as a solid state memory media or a dynamic memory media such as an optical, magnetic or magneto-optical memory media, including magnetic disks, cassettes, tapes, hard disks and optical disks such as Compact Disk (CD)-Read Only Media (ROM) or Digital Versatile Disc (DVD)-ROM. The computer program product may comprise a carrier wave signal and computer executable instructions carried therewith.

Advantageously, it is possible to use relatively inexpensive components to provide for sufficient stability in satellite signal demodulation and decoding by allowing the demodulation to fluctuate along the frequency changes in the second frequency signal, whilst these frequency changes can still be effectively compensated for by adaptive decoding and use of interpolated difference between the first and second frequency signal. The interpolation allows quick and accurate compensation of frequency changes needed due to the order of magnitudes difference in the local frequency source signals and the layer 1 satellite radio signals that are being received. For instance, in GPS, the layer 1 satellite radio signals have a frequency of approximately 1575 MHz whereas the frequency of the local frequency source signals is typically in the range of 1 to 20 MHz.

It should be appreciated that the embodiments of any one aspect may produce corresponding advantages when combined with different other aspects as well and that they can be combined where applicable.

BRIEF DESCRIPTION OF THE DRAWINGS

The invention will now be described, by way of example only, with reference to the accompanying drawings, in which.

DETAILED DESCRIPTION

Figure 1:
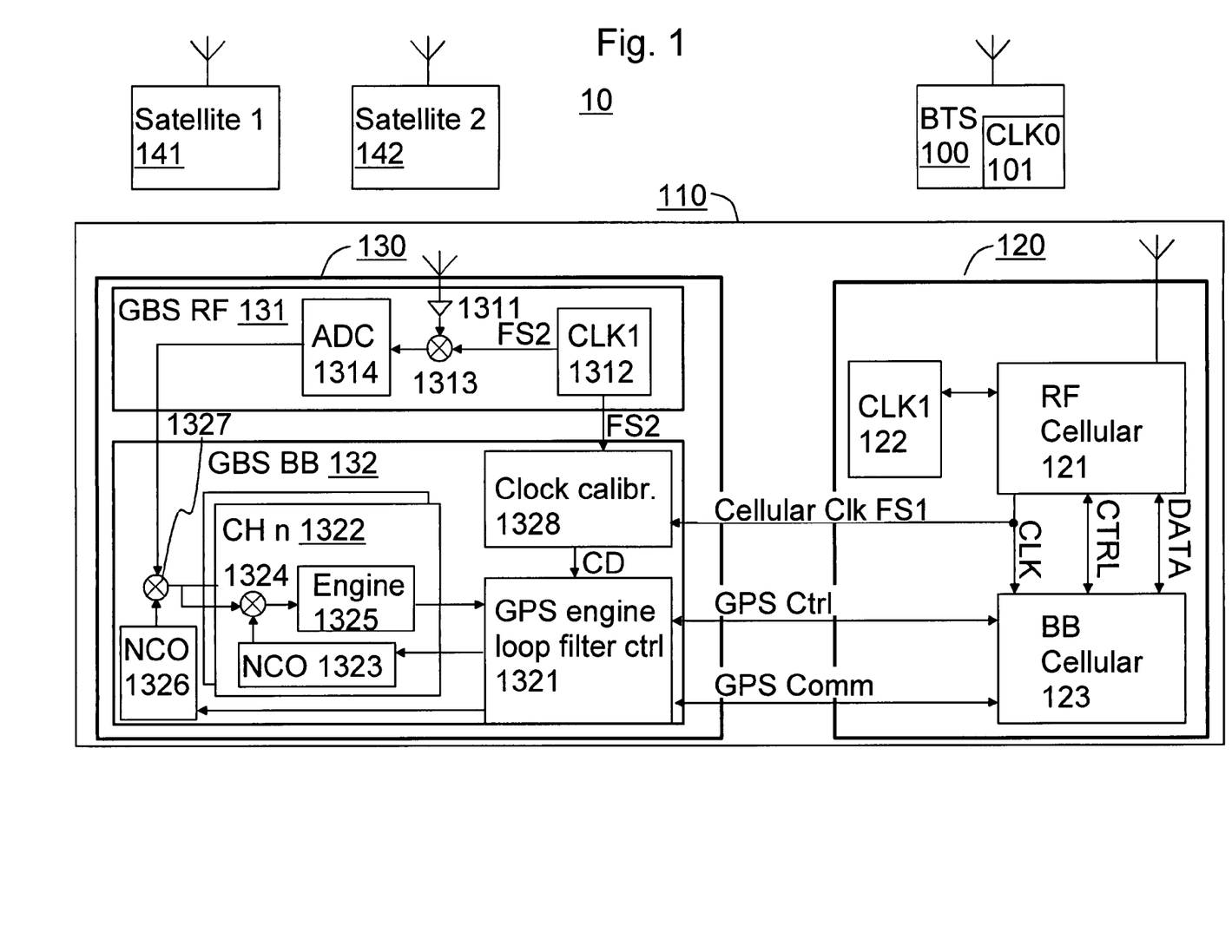
FIG. 1 is a schematic drawing of a system according to the preferred embodiment of the invention.

FIG. 1 is a simplified schematic drawing of a system 10 according to the preferred invention. FIG. 1 illustrates the components of the system useful to describe the invention, that is a base station 100, a mobile device 110 comprising a cellular communications block 120 and satellite positioning block 130, and two satellite transmitters 141 and 142.

The base station 100 comprises a base station frequency source that should control the base station so that the frequency of its radio signals is accurate to ±0.05 ppm.

The communications block 120 comprises the typical means for communicating with a cellular base station, including a cellular Radio Frequency (RF) block 121, a cellular clock 122 for producing a first frequency signal for controlling the frequencies of the RF block 122 and a cellular Base Band (BB) block 123. The communications block 120 has been connected with the satellite positioning block 130 and can communicate over a radio communication channel with the base station 100. The communications block 120 may contain typical user interface devices such as a speaker, microphone, display, and/or one or more keys, not shown in FIG. 1.

The satellite positioning block 130 comprises a satellite RF block 131 and a satellite BB block 132. The satellite RF block 131 comprises means for receiving and demodulating satellite signals, including a Low Noise Amplifier 1311 for amplifying satellite signals, a local satellite oscillator 1312 for producing a second frequency signal FS2, a satellite demodulator 1313 for demodulating the satellite signals by using the second frequency source, and an Analogue to Digital Converter (ADC) to digitise the demodulated satellite signals for the satellite BB block 132. The satellite BB block comprises a satellite engine loop filter control block 1321, a decoder 1322 for a channel n, a first Numerically Controlled Oscillator (NCO) 1326, a first mixer 1327 and a local satellite oscillator compensation or calibration block 1328. The control block 1321 may comprise a dedicated hardware engine or a DSP or Master Control Unit (MCU) running software algorithms that produce control outputs and take control inputs.

The cellular RF block 121 has been configured to feed a cellular clock signal FS1 to the local satellite oscillator compensation block 1328 for use as a reference clock signal in the satellite positioning block 130. The cellular clock FS1 signal preferably has the same frequency as the first frequency signal, but alternatively the cellular clock signal FS1 may have a frequency that has a predetermined relationship to the first frequency signal. For instance, the cellular clock signal FS1 may have a frequency equal to that of the first frequency signal multiplied or divided by a predetermined integer or non-integer coefficient.

The cellular BB block 123 has been configured to exchange satellite control and communication signals with the satellite engine loop filter control block 1321 to supply network assisted satellite positioning data to the satellite positioning block 130. The network assisted satellite positioning is an optional feature for the invention which may greatly reduce the Time-To-First-Fix, but not mandatory as the satellite information can also be obtained by other means or from the satellites themselves as is known from the GPS system, for instance.

The satellite BB block 132 comprises a closed control loop formed of the satellite engine filter loop control block 1321, the first NCO 1326, the mixer 1327 and the decoder 1322. The satellite BB block 132 preferably comprises a number of decoders, such as a total of 12 or 16 decoders, although only one of them has been drawn in detail in FIG. 1 and only one may be necessary. Hence, the satellite BB block 132 would also contain 12 or 16 parallel closed control loops corresponding to that using the decoder 1322. The decoder 1322 forms an inner control loop with a second NCO 1323, a second mixer 1324 and a satellite engine 1325. The control block 1321 has been configured to control the second NCO 1323 that has been configured to produce a signal to be mixed with the output of the first mixer 1327. The output of the second mixer 1324 is connected to the satellite engine 1325. As mentioned in the foregoing (the closed control loop), the satellite engine 1325 provides information to the loop control block 1321. The loop control block 1321 has been further configured to receive input from the local oscillator compensation block 1328. The compensation block 1328 has inputs for the cellular clock signal FS1 and for the second frequency signal FS2. The compensation block 1328 has been configured to detect changes in the second frequency signal FS2 frequency relative to the cellular clock signal and to provide correspondingly Compensation or calibration Information CD to the loop control block 1321. Armed with the compensation information CD, the loop control block 1321 can take into account the drifting occurring in the local satellite oscillator 1312 and control the operation of the decoders via the first NCO 1327 so as to stabilise the output of the first mixer 1327 that is supplied to the decoders.

Alternatively and/or complementarily to controlling the first NCO 1326 to compensate the drifting of the frequency of the second frequency signal FS2, the loop control block 1321 may be configured to control the operation of the satellite engine 1325 of the decoder 1322 by controlling the operation of the second NCO 1323. This may negate the requirement for the first NCO 1326 and the first mixer 1327 especially if only one channel has been implemented. The satellite engine 1325 is responsible for decoding signals from one or more satellites 141, 142 and the first and second NCOs 1323 and 1327 help the satellite engine by attempting to stabilise the demodulated satellite signals or compensate for the changes caused, for example, by Doppler shift and the drifting of the second frequency signal FS2.

Figure 2:
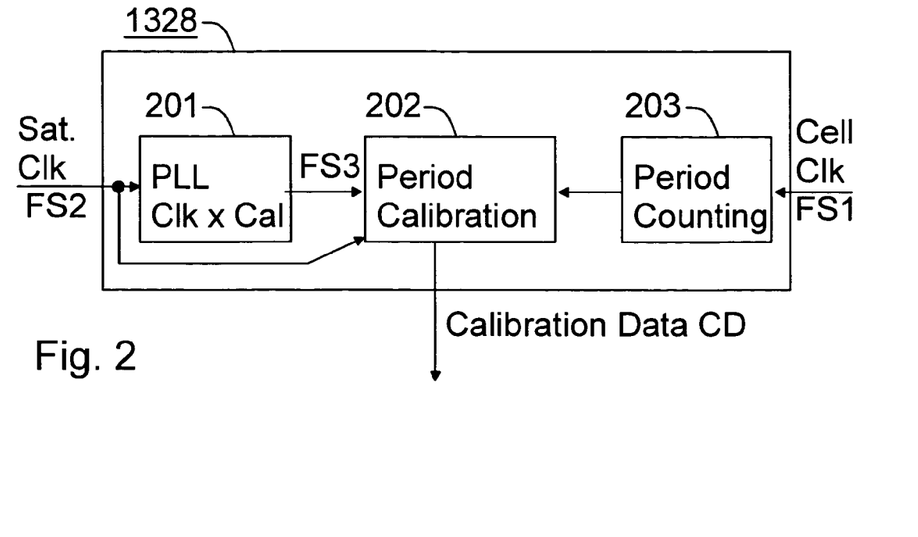
FIG. 2 is a schematic drawing of the local satellite oscillator compensation or calibration block of FIG. 1.

FIG. 2 is a schematic drawing of the local satellite oscillator compensation block 1328 of FIG. 1. The compensation block 1328 comprises a frequency change block 201 such as a PLL & VCO circuit to produce a third frequency signal FS3 and a period calibration block 202 configured to receive the third frequency signal FS3. The frequency change block 201 preferably produces the third frequency signal FS3 by multiplying the frequency of the second frequency signal FS2 by a predetermined frequency change factor such as 1.000001 to 1.2. The compensation block 1328 further comprises a period counter 203 configured to receive the cellular clock signal FS1 and to signal to the period calibration block 202 on every predetermined number cellular clock signal FS1 cycles, where that number is a figure chosen so that sufficiently frequent drifting checks can be performed with a sufficient accuracy within a given time period. In the preferred embodiment, the said number is chosen dependent on the cellular clock signal FS1 frequency so that the cellular clock signal FS1 has that many counts with the interval of 10 ms to 500 ms.

A 20 ms interval is particularly useful as this provides for simplified numerical operation for a GPS receiver by corresponding to an optimum coherent integration time of a GPS system. The period calibration block 202 has also been configured to receive, in addition to the signals from the frequency change block 201 and period counter 203, the second frequency signal FS2 (that is the output of the local satellite oscillator 1312). The period calibration block 202 has been configured to calculate the relationship or the changes in the relationship between the frequencies of the cellular clock signal FS1 and the second frequency signal FS2 and to output a corresponding compensation data CD to the loop control block 1321. The task of the compensation block 1328 is to monitor or detect the relationship of the frequencies of the cellular clock signal FS1 and the second frequency signal FS2. This task is preferably performed by using interpolation such as Vernier interpolation as will be described with reference to FIG. 3. The frequency change block 201 is typically started when the period counter 203 indicates a start event, then stopped after one or two co-incidences and restarted again when the period counter has counted a predetermined number of cellular clock signal FS1 periods (which event is a stop event for one time period to be determined by interpolation and may also be a start event for a next such time period).

Referring to both FIG. 1 and FIG. 2, it should be appreciated that the satellite RF block 131 preferably relies on the local satellite oscillator 1312 in demodulating the satellite signals for the satellite BB block 132 and that the local oscillator compensation block 1328 monitors the second frequency signal FS2 in relation to the cellular clock signal FS1. The loop control block 1321 keeps receiving the and using the compensation data CD to adapt the decoder 1322 so that the changes in the second frequency signal FS2 are compensated for. Of course, the cellular clock signal FS1 may also drift and hence the difference between the cellular clock signal FS1 and the second frequency signal FS2 may change even if the local satellite oscillator 1312 has remained stable, but typically the local cellular oscillator 122 is of a more stable type than the local satellite oscillator 1312 and hence the changes in the difference are mainly caused by the local satellite oscillator 1312. The preferred embodiment of the invention does, additionally, allow detecting and compensating certain changes in the cellular clock signal FS1 as will be described with further detail with reference to FIGS. 3, 4 and 5

Figure 3:
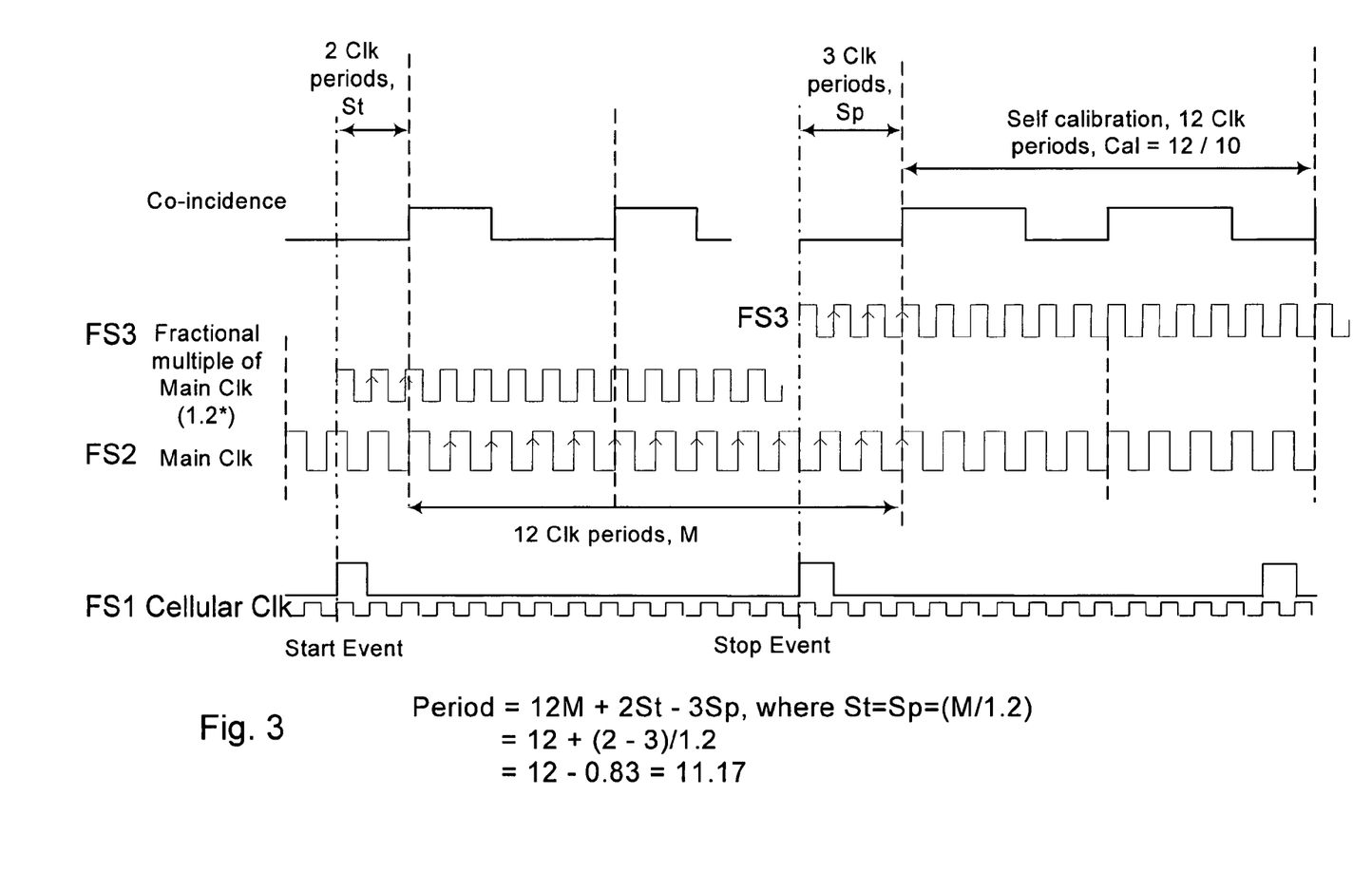
FIG. 3 is a schematic drawing illustrating the use of Vernier interpolation in accordance with the preferred embodiment of the invention.

FIG. 3 illustrates the use of Vernier interpolation to determine the relationship between the second frequency signal FS2 and the cellular clock signal FS1. FIG. 3 shows two consecutive signals provided by the period counter 203 to the period calibration block 202 labelled as a "Start Event" and "Stop Event" on a time axis common with a representation of the cellular clock signal FS1, the second frequency signal FS2 and the third frequency signal FS3 as well as an indication of the co-incidence between the second frequency signal FS2 and the third frequency signal FS3. FIG. 3 also illustrates the deriving of two counters, a STart (ST) counter and a StoP (SP) counter. The second and third frequency signals FS2 and FS3 have a co-incidence whenever the third frequency signal FS3 is high at the rising edge of the second frequency signal. Notice that the second and third frequency signals FS2 and FS3 typically rise substantially simultaneously with a particular periodicity if, for example, a PLL is used to derive the third frequency signal FS3 from the second frequency signal FS2. The relationship between the second and third frequencies should be stable. This relationship may be further verified as illustrated as a self calibration period in FIG. 3. The relationship may be fixed or adapted based on temporal needs, for instance. The Start and stop events are based on counting a particular number (here 14) of cellular clock signal FS1 periods.

The frequency change factor in FIG. 3 is 1.2 or the third frequency signal FS3 has 12 clock periods in the time the second frequency signal FS2 has 10. Hence the second and third frequency signals FS2 and FS3 coincide every 5 and 6 periods on the second and third frequency signals FS2 and FS3, respectively. It should be appreciated that FIG. 3 is a very simplified sketch and that in the preferred embodiment the start and stop events would reside tens or thousands of clock periods apart of each other, in order to provide a high accuracy of monitoring.

Figure 4:
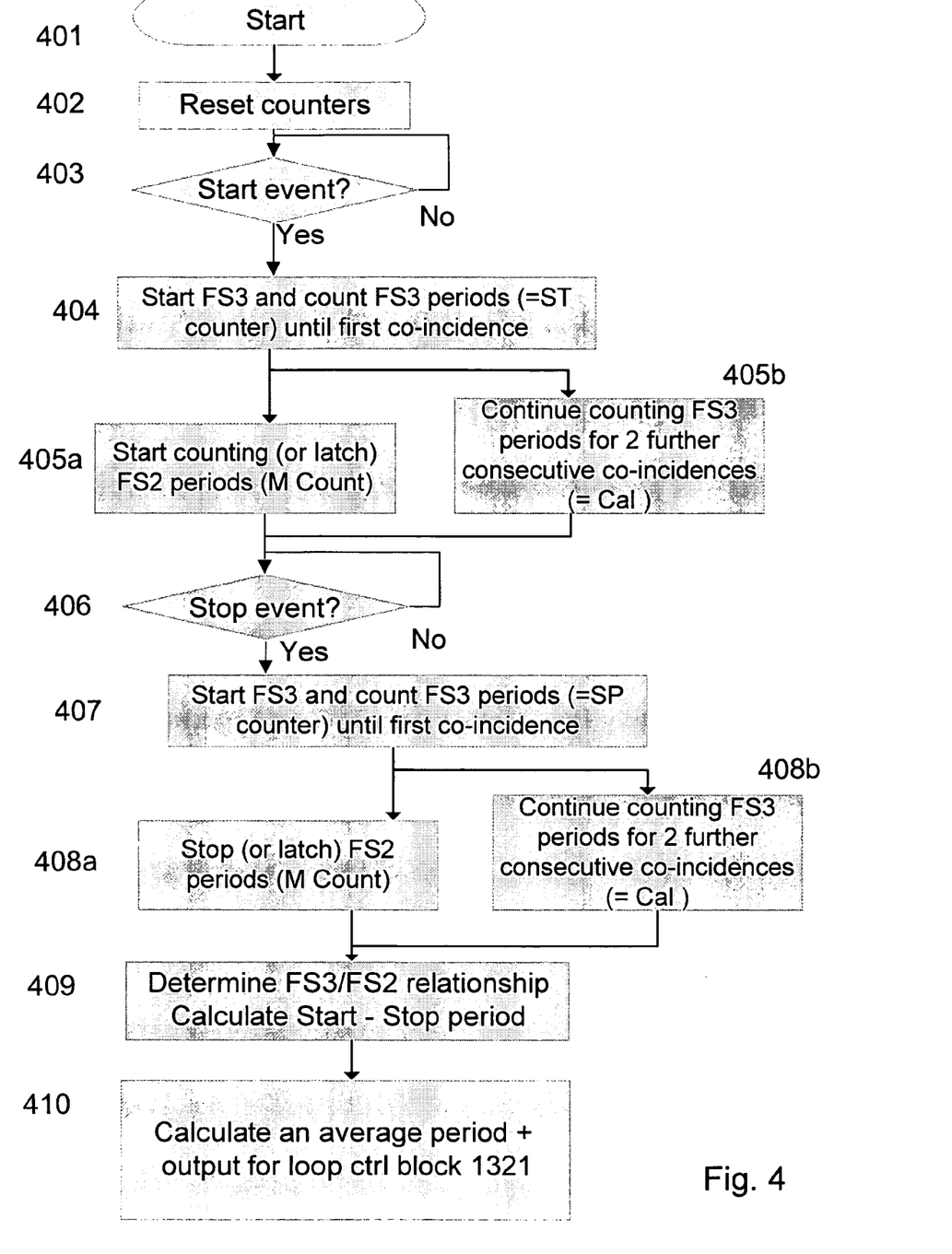
FIG. 4 is a flow chart illustrating the operation of a GPS local oscillator calibration block shown in FIG. 1.

Referring now to FIG. 4 in conjunction with FIG. 3, the procedure in the local oscillator compensation block 1328 starts from step 401. In step 402, the counters are cleared or set to value zero. In step 403, the presence of a start event is checked. In the preferred embodiment, this step refers to the period calibration block 202 receiving a signal from the period counter block 203. As in the preferred embodiment the period counter 203 sends a signal after every predetermined number of cellular clock periods, the start and stop events actually consist of two consecutive period counter 203 signals. Alternatively, the period counter 203 may indicate the start and stop events in a distinct manner to the period calibration block. In any case, the start event starts the counting of periods of the third frequency signal FS3 for determination of the period or interval between the start and stop events. Hence, the start event and the third frequency signal FS3 start in a common phase as shown in FIG. 3.

In step 404, the frequency change block 201 starts to produce the third frequency signal FS3 and to count FS3 periods by the ST counter for the period calibration block 202 to determine how many FS3 periods precede the first co-incidence. On the first co-incidence, the period calibration block 202 memories the ST counter and stops counting the FS3 periods. It should be appreciated that the delay from the start event to the first co-incidence is an integer number of FS3 periods. After the first co-incidence after the start event has been found, the frequency change block 201 may be stopped to save power, although the frequency change block 201 is preferably allowed to run until a second or third co-incidence to verify the frequency ratio for the second and third frequency signals FS2 and FS3 as shown in step 405*b*.

Next, in step 405*a*, the period calibration block 202 starts counting second frequency signal FS2 periods with a counter, M.

Some time later, the stop event step 406 triggers step 407 which restarts the frequency change block 201 to generate the FS3. The period calibration block 202 starts counting FS3 periods by the SP counter until the first co-incidence after the stop event. The counting of FS3 periods is continued in step 408*b* for 2 further consecutive co-incidences to determine the relationship between the second and third frequency signals FS2 and FS3 (to determine the frequency ratio Cal).

Simultaneously with the first co-incidence after the stop event, step 408*a* stops or latches the count of FS2 periods, counter M.

The FS3/FS2 relationship may be determined by measuring the number of periods in the each of the FS3 and FS2 for at least two co-incidences, during the period between the start and stop events (eg: step 405*b*), before the start event or after the stop event (eg: step 408*b*). Regardless the period used for measuring, the ratio between the period times of the FS3 and FS2 can be determined in step 409. The determining based on two co-incidence periods allows to verify the exact ratio which otherwise could be misinterpreted by one period. Alternatively, the determination may be based on one or more than two co-incidence periods or no determination is made at all, but instead the frequency changing block 201 is considered reliable so that the expected ratio is presumed to have realised. The interval or duration in second frequency signal FS2 periods between the start and stop events is calculated as $$\text{Period} = M\text{ counter} + [(ST\text{ counter} - SP\text{ counter})/\text{Cal}] \quad (1)$$

wherein M is the number of periods of the second frequency signal FS2 between the Start and Stop events and Cal is ratio between the frequencies of the third frequency signal FS3 and the second frequency signal FS2 (1.2 in FIG. 3). Hence, the period in FIG. 3, in periods of the second frequency signal FS2 periods, is:

$$12 + [(2-3)/1.2] = 11.17$$

As can be seen from the example, it is possible to measure the relationship of the frequencies of the second frequency signal FS2 and the cellular clock signal FS1 with an accuracy or resolution higher (better i.e. able to show changes smaller) than one clock cycle of the second frequency signal. The resolution achieved depends on the number of cellular clock signal FS1 being counted and the ratio Cal. This resolution is by far better than if the cellular clock signal FS1 were simply compared with a local satellite clock. The accuracy of the clock signal comparison, without the interpolation suggested by the inventor, would highly depend on the lower frequency between the cellular clock signal FS1 and the second frequency signal. For instance, if both the cellular clock signal FS1 and the second frequency signal FS2 had a 16 MHz frequency, and the cellular clock signal FS1 were ideally stable, the maximum resolution that could be achieved by clock cycle comparison for a 20 ms interval would be (1 cycle/(0,020 s×16,000,000 cycles/s) ppm=3.125 ppm. This would translate to an error in the GPS satellite signal frequency of 3.125 ppm×1.575 GHz=4.921 kHz. Even if the period were 1 second the resolution would be 0.063 ppm translating to a GPS satellite frequency resolution of 98 Hz. Whilst this is sufficient for an initial calibration to reduce the required frequency search and hence TTFF, it is of little use to indicate that the satellite frequency has drifted. In comparison, a hundredfold resolution of 0.3125 ppm will be theoretically reached by using Cal 1.01 and even higher resolution will be gained by increasing the period of the calibration and/or averaging the results form numerous consecutive start-stop event intervals.

An average or running average of past results of step 409 is calculated in step 410. Indeed it is possible to simply latch rather than stop the counts M of the second frequency and St/Sp of the third frequency on every coincidence following an event which may be viewed as either a start or a stop event. This is similar to Lap timing in a race. This method allows consecutive periods to be added together with no loss of resolution so that the period of calibration can be selected under software control.

The period represented by the average is referred to as a comparison period and the result as a comparison difference.

After step 410, the simultaneous processing of the counters (in steps 406, 407, 408) will be completed and new start—stop period is calculated in step 409, averaged in step 410 and the results are provided to the loop control block 1321 also in step 410. Hence, the compensation block 1328 keeps on executing a continuous process unless that process is manually or automatically interrupted.

It should be appreciated that the reference frequency signal or the cellular clock signal FS1 does not remain stable and hence some changes in comparison difference are actually caused by changes in the cellular clock. Preferably, at least some of the changes in the cellular clock signal FS1 are further compensated in step 410 as will next be explained with reference to FIG. 5 and FIG. 6.

When using such a fast and high-resolution calibration system as that explained in the foregoing, it would normally be assumed that the reference it is calibrating against is stable. However, the cellular clock signal FS1 derived from the local cellular frequency source 122, may be subject to a regular changes (possibly caused by Frequency Control) and internal drifting (thermal drifts) during the GPS calibration periods, even if the local cellular frequency source would be a Voltage-Controlled Temperature Compensated Crystal Oscillator (VCTCXO).

The cellular oscillator 122 may have an overall specification of absolute frequency deviation of approximately ±0.38 ppm when locked to the cellular network base station 100 but this is not typically a sufficient accuracy for the satellite system such as the GPS system during tracking or so-called long acquisitions. The following effects may cause the cellular Oscillator 122 to drift or change:

Temperature change in the mobile device 110;
The motion of the mobile device 110 relative to the base station 100 causes a Doppler shift depending on the speed and direction of the motion of the mobile device 110;
Handover between base stations (change in reference clock and/or perceived Doppler shift); and
Various frequency effects.

The base-station relative Doppler shift may account up to ±0.23 ppm (on 250 Km/h speed directly towards or away from the base station 100), although this is an unusual occurrence. The GSM & 3GPP specifications call for the base station 100 to be accurate to ±0.05 ppm and the cellular transmitter to be within ±0.1 ppm of this when the user is stationary (no Doppler), totalling ±0.15 ppm. The Doppler shift effectively adds an offset, which is practically constant on the scale of fractions of a second. Hence, the Doppler and specified maximum drifts together may cause a maximum error of ±0.38 ppm.

One should appreciate that a typical cellular system may attempt to correct the transmission frequencies of the mobile device 110 through frequency control steps, to keep the mobile device 110 effectively locked to the base station 100. This may be done in many ways some of which may use a direct control loop with the cellular oscillator to provide fine adjustments to the cellular RF output. The cause of the drift being corrected is inessential since the changes will be corrected in the same way regardless what is their source. The cellular frequency reference will hence remain substantially constant except for a temperature drift and any offset changes caused by the frequency control steps.

Figure 5:
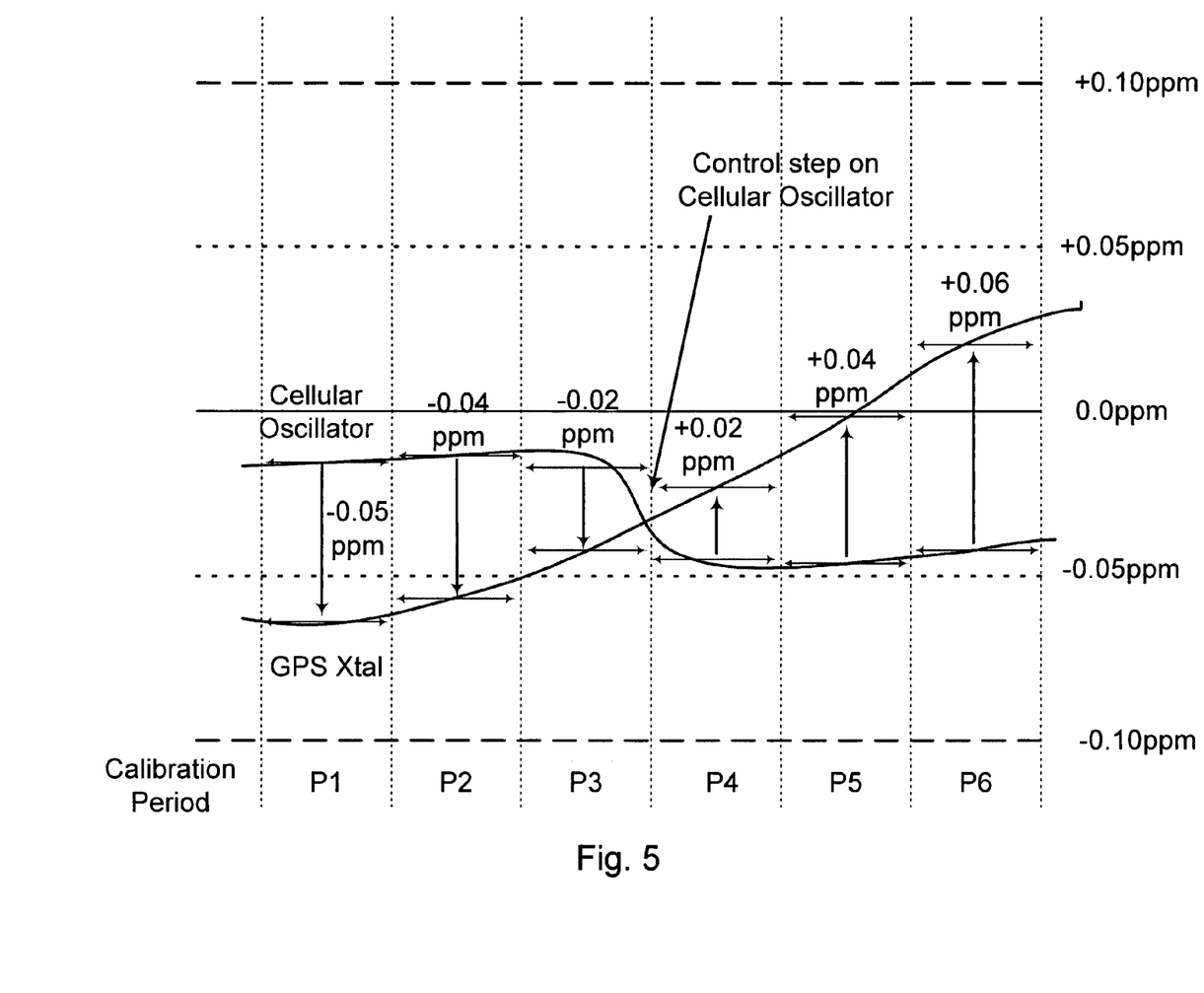
FIG. 5 is a graph illustrating imaginary outputs for the cellular and GPS local oscillators of FIG. 1 to support the description of the operation of a device of FIG. 1.

FIG. 5 illustrates the effect of changes in the local cellular oscillator 122 and the local satellite oscillator 1312 relative to their nominal values during 6 subsequent comparison periods. In FIG. 1, the local satellite oscillator 1312 is shown as having drifted by approximately 0.09 ppm from comparison period 1 to comparison period 6. However a change of approximately 0.11 ppm would be measured due to the step change in the cellular oscillator. This measured change must be adjusted to prevent the GPS system being compensated too much, which would probably result in a loss of lock and tracking of the satellites. A drift of 20 Hz/sec at the satellite layer 1 frequency (approximately 1.575 GHz in GPS) would typically be considered as a rapid or excessive change. This is only 0.013 ppm/second.

Further, if the acquisition or tracking period is long (for example, more than 1 second) due to the need to search for extra weak signals, then with a rapid frequency drift the satellite signal energy will be dispersed across a greater frequency spectrum. If this drift is not continuously tracked and compensated then this may prevent any usual peak from being detected above the noise. Hence, it is very beneficial to compensate for the changes both in the local satellite oscillator 1312 and in the cellular clock signal FS1 during the acquisition period in which satellite signals are searched.

It should be appreciated that the accuracy requirement of the cellular frequency locked to the base station 100 is dependant upon the mode in which the mobile device 110 is operating. This is subject to many algorithms and hence, the Frequency Control operation is far from constant resulting in different variations in the cellular clock signal FS1.

In the preferred embodiment, the compensation block 1328 attempts to statistically detect frequency control offset changes in the cellular clock signal FS1. To facilitate this detection, the difference between the second frequency signal FS2 and the cellular clock signal FS1 should be detected repeatedly with a rate higher than that in which frequency control steps occur, preferably with twice that rate in which the frequency control steps occur. In the flowchart shown in FIG. 4, the step 410 should thus, before averaging the determined comparison differences, check if the comparison difference has probably changed because of a frequency control step caused impulse on the cellular clock signal FS1. That the sudden frequency control based changes can actually be detected against true changes in the oscillators is based on the fact that any change in temperature will be reasonably consistent across every calibration period, whether it is great or small. Hence the two types of variation can be identified.

It should be appreciated that the use of Vernier Interpolation is possible with two slightly different frequency signals (second and third frequency signals FS2 and FS3) and that it is inessential whether the second or third frequency signal FS3 has a higher frequency or if the higher or lower frequency signal is used to count the clock periods in determining the interval between the start and stop events. Further, it is not desirable to have any sudden step change in the reference frequency which is used by a PLL to be multiplied up by say, 1.02 times. The PLL has to create an accurate stable frequency and a step change in its input will cause a large error in its control stage. By using the local satellite oscillator 1312 as the reference source, there will only be slow (with regard to the PLL) changes in its output. The cellular BB clock 132 is then used to generate the appropriate start/stop period to be measured against the local satellite oscillator 1312.

The satellite positioning block 130 may comprise a further local frequency source which is a division from the generated GPS Layer1 frequency, 1.575 GHz. The satellite demodulator 1313 and the compensation block 1328 have been configured capable of switching between the local satellite frequency source and the further local frequency source. This enables changes to be detected directly in the crystal or in the (divided down) generated L1 frequency with its associated VCO and PLL. Therefore the frequency change block 201 (e.g. a PLL & VCO facilitating Vernier interpolation) preferably has an input frequency range suited to operate with either of the two optional frequency sources, for instance, of 12.5 to 50 MHz.

Figure 6:
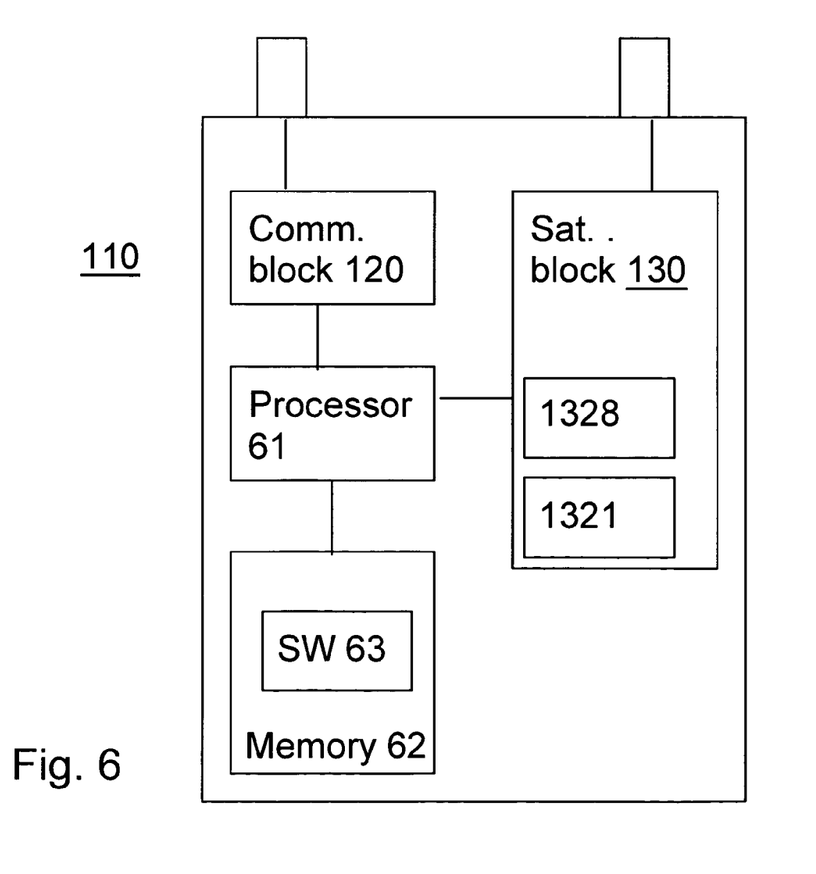
FIG. 6 is schematic drawing of the mobile device of the preferred embodiment.

FIG. 6 is schematic drawing of the mobile device 110 of the preferred embodiment, showing the communications block 120, the satellite positioning block 130 (with blocks 1321 and 1328 shown) and further a processor 61 connected to both blocks 120 and 130 and a memory connected to the processor 61 and containing computer executable program code or software 63 for controlling the operation of the communications block 120 and the satellite positioning block 130 when executed by the processor 61.

The mobile device 110 may be a mobile telephone with satellite positioning capability, a data communication device such as a Personal Digital Assistant with data communications and satellite positioning and optionally having a voice communication capability, a combination of modular communications and satellite positioning blocks or a portable computer with communication and satellite positioning capabilities, for example. The satellite positioning and/or communication capabilities may be provided by add-on cards or modules such as PC-cards, memory media compatible cards, or extension blocks that can be connected to by connectors. The blocks 120 and 130 are preferably galvanically connected but alternatively any other methods such as optical or (preferably low-power or short range) radio based data transmission can be applied for communications between these blocks. The functionality provided by the invention can be added or enabled after the manufacture of the mobile device, for example, by means of downloadable software or software upgrade, feature release function, add-on memory media carrying the software.

The processor 61 may consist of a single computing entity such as a Central Processing Unit (CPU) or Digital Signal Processor (DSP), or it may comprise two or more distributed computing elements such as DSPs or CPUs. Correspondingly, the memory 62 may consist of single memory storage such as a non-volatile solid-state memory or dynamic storage. Alternatively, the memory 62 may comprise two or more such memory storages.

The interpolation may be user selectable or applied selectively depending on various factors such as the available power, the quality and/or strength of radio signals received from a positioning satellite and/or a base station, the motion of the mobile device 110. Such selective disabling of the enhanced positioning may be useful to save battery life or to release computing capacity for other tasks particularly when satellite positioning is not momentarily required. This may be the case particularly when an office worker who stays in an office during a working day carries the mobile device. In case of such disabling of the interpolation, the mobile device 110 may yet have been configured to occasionally or repeatedly perform interpolation to recheck its position.

Advantageously, it is possibly to use relatively low-frequency frequency sources in connection with the use of the interpolation without excessively compromising the satellite positioning, which translates into the possibility to perform the computation related to the interpolation at a lower clock frequency, smaller power consumption and smaller electromagnetic interference, particularly ideally for battery operated and/or handheld or portable devices.

A dual mode device capable of operating as a mobile communication device and as a satellite positioning device has been explained with reference to the preferred embodiment of the invention and some variations of the preferred embodiment. However, the present invention may be embodied in other specific forms without departing from its essential attributes. It should be appreciated that the entire detailed description describes a preferred embodiment and can be freely varied by removing, replacing or adding features of this detailed description. That the various features described are optional has not been emphasised for each feature only in sake of clarity and conciseness of the description. Furthermore, each feature disclosed in this specification (which terms includes the claims) and/or shown in the drawings may be incorporated in the invention independently of other disclosed and/or illustrated features. In this regard, the invention includes any novel feature or combination of features disclosed herein either explicitly, implicitly or any generalisation thereof irrespective of whether or not it relates to the claimed invention or mitigates any or all of the problems addressed.

The appended abstract as filed herewith is included in the specification by reference.

The invention claimed is:

1. A mobile communication and positioning device comprising:
    a first frequency source configured to produce a temperature compensated first frequency signal;
    a second frequency source configured to produce a second frequency signal having a frequency independent of the first frequency source;
    a satellite positioning demodulator configured to demodulate radio signals of a satellite transmission based on the second frequency signal;
    a detector configured to detect, with a resolution higher than one clock cycle of the second frequency signal, changes in the frequency difference between the first frequency signal and the second frequency signal by using interpolation; and
    a decoder configured to decode the demodulated satellite radio signals while taking into account the changes in the frequency difference to compensate for errors of the demodulation caused by frequency drifts in the second frequency signal.

2. A mobile communication and positioning device according to claim 1, wherein the detector has been configured to apply a Vernier method for the interpolation.

3. A mobile communication and positioning device according to claim 1, further comprising a mobile communication modulator configured to modulate information signals for radio transmission to a terrestrial base station based on the first frequency signal.

4. A mobile communication and positioning device according to claim 1, wherein the first frequency source is configured to repeatedly calibrate itself to provide a substantially stable first frequency signal using a frequency source of a base transceiver station.

5. A mobile communication and positioning device according to claim 1, wherein the second frequency source is of a non-compensated temperature type.

6. A mobile communication and positioning device according to claim 1, wherein the detector is configured to determine for changes in the first frequency signal that have been caused by controlling the first frequency source based on the frequency source of a base station.

7. A mobile communication and positioning device according to claim 6, in which the device is further configured to compensate the determined changes in the first frequency signal due to the frequency control in order to stabilise the decoding.

8. A mobile communication and positioning device according to claim 1, further comprising a receiver configured to receive satellite control and communication signals from a base station for network assisted satellite positioning.

9. A mobile communication and positioning device according to claim 1, in which the device is further configured to selectively enable or disable the interpolation depending on a predetermined condition.

10. A mobile communication and positioning device according to claim 9, wherein the predetermined condition is selected from a group consisting of: the available power changing to a particular level, the quality or power of radio signals received from a positioning satellite changing to a predetermined level or by a predetermined rate or amount, the quality or power of radio signals received from a base station changing to a predetermined level or by a predetermined rate or amount, motion of the device changing to a predetermined level or by a predetermined rate or amount and receiving a particular user command.

11. A method of operating a mobile communication and positioning device comprising:
   producing a temperature compensated first frequency signal;
   producing a second frequency signal having a frequency independent of the first frequency source;
   demodulating radio signals of a satellite transmission based on the second frequency signal;
   detecting, with a resolution higher than one clock cycle of the second frequency signal, changes in the frequency difference between the first frequency signal and the second frequency signal by using interpolation; and
   decoding the demodulated satellite radio signals taking into account the changes in the frequency difference to compensate for errors of the demodulation caused by frequency drifts in the second frequency signal.

12. A method according to claim 11, wherein a Vernier method is used for the interpolation.

13. A method according to claim 11, further comprising repeatedly calibrating the first frequency signal using a frequency source of a base transceiver station.

14. A method according to claim 11, further comprising the step of determining changes in the first frequency signal that have been caused by controlling the first frequency source based on the frequency source of a base station.

15. A method according to claim 14, further comprising compensating the determined changes in the first frequency signal due to the frequency control in order to stabilise the decoding.

16. A method according to claim 11, further comprising receiving satellite control and communication signals from a base station for network assisted satellite positioning.

17. A memory media storing a computer program for controlling a mobile communication and positioning device, the device comprising a first frequency source configured for producing a temperature compensated first frequency signal; a second frequency source configured for producing a second frequency signal having a frequency independent of the first frequency source; and a satellite positioning demodulator configured for demodulating radio signals of a satellite transmission based on the second frequency signal; the computer program comprising:
   computer executable program code for causing the mobile communication device to detect, with a resolution higher than one clock cycle of the second frequency signal, changes in the frequency difference between the first frequency signal and the second frequency signal by using interpolation; and
   computer executable program code for causing the mobile communication device to decode the demodulated satellite radio signals configured to take into account the changes in the frequency difference to compensate for errors of the demodulation caused by frequency drifts in the second frequency signal.

* * * * *